US007653879B1

(12) United States Patent
Sareen et al.

(10) Patent No.: US 7,653,879 B1
(45) Date of Patent: Jan. 26, 2010

(54) USER INTERFACE FOR CONTEXT SENSITIVE CREATION OF ELECTRONIC MAIL MESSAGE HANDLING RULES

(75) Inventors: Chaitanya Dev Sareen, Seattle, WA (US); Paul Daley, Redmond, WA (US); Radu Bacioiu, Kirkland, WA (US); Christopher Cameron White, Seattle, WA (US); Michael Philip Arcuri, Seattle, WA (US); Raja Charu Vikram Kakumani, Bellevue, WA (US); Julie Madhusoodanan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 545 days.

(21) Appl. No.: 10/663,291

(22) Filed: Sep. 16, 2003

(51) Int. Cl.
*G06F 3/00* (2006.01)
(52) U.S. Cl. .................. 715/752; 715/708; 715/713
(58) Field of Classification Search ............. 715/514, 715/708, 752, 706, 713
See application file for complete search history.

(56) References Cited

U.S. PATENT DOCUMENTS

| 5,664,133 | A  |   | 9/1997  | Malamud et al.       |
|-----------|----|---|---------|----------------------|
| 6,077,312 | A  | * | 6/2000  | Bates et al. ........ 717/129 |
| 6,101,485 | A  | * | 8/2000  | Fortenberry et al. .... 705/27 |
| 6,133,917 | A  |   | 10/2000 | Feigner et al.       |
| 6,205,415 | B1 | * | 3/2001  | Butts et al. ........ 703/27 |
| 6,453,327 | B1 | * | 9/2002  | Nielsen ............. 715/500 |
| 6,601,012 | B1 |   | 7/2003  | Horvitz et al.       |
| 6,782,413 | B1 | * | 8/2004  | Loveland ............ 709/204 |

2002/0016824 A1 * 2/2002 Leeds ................. 709/207

OTHER PUBLICATIONS

Tom Syroid and Bo Leuf Outlook 2000 in a Nutshell: A Power User's Quick Reference Published May 2000 First Edition pp. 15, 244-252.*
Microsoft Outlook 2000 Copyright 1995-1999 Screenshots.*
Diane Poremsky Sams Teach Yourself Microsoft Office Outlook 2003 in 24 Hours Sep. 12, 2003.*
Diane Poremsky Sams Tech Yourself Microsoft Office Outlook 2003 in 24 Hours Sep. 12, 2003.*
Cesta, A. et al., "Active Interfaces for Useful Software Tools," *Symbiosis of Human and Artifact: Human and Social Aspects of Human-Computer Interaction*, vol. b, pp. 225-230 (© 1995).
Hinde, S., "Spam, scams, chains, hoaxes and other junk mail," *Computers & Security*, vol. 21, No. 7, pp. 592-606 (2002).

(Continued)

*Primary Examiner*—William L Bashore
*Assistant Examiner*—Andrea N Long
(74) *Attorney, Agent, or Firm*—Merchant & Gould

(57) ABSTRACT

A contextually sensitive user interface for defining an e-mail message handling rule is provided. The user interface includes one or more user interface objects for specifying conditions for the rule and one or more user interface objects for defining the actions to be performed if the specified conditions are met. The conditions that are displayed within the user interface for selection are chosen, at least in part, based upon the context in which a request to create the e-mail handling rule is received. The displayed conditions may be based, in part, upon the contexts of reading an e-mail message, creating an e-mail message, creating an alert subscription, or selecting a user name.

21 Claims, 8 Drawing Sheets

OTHER PUBLICATIONS

Marx, M. et al., "CLUES: Dynamic Personalized Message Filtering: Proceedings of the ACM 1996 Conference on Computer Supported Cooperative Work," *Computer Supported Cooperative Work*, pp. 113-121 (1996).

Payne, T. et al., "Interface agents that learn: An investigation of learning issues in a mail agent interface," *Applied Artificial Intelligence*, vol. 11, No. 1, pp. 1-32 (Jan.-Feb. 1997).

Pollock, S., "A rule-based message filtering system," *ACM Transactions on Office Information Systems*, vol. 6, No. 3, pp. 232-254 (© Jul. 1988).

Shoval, P. et al., "Strategies for filtering E-mail messages combining content-based and sociological filtering with user-stereotypes," *Next Generation Information Technologies and Systems, 4th International Workshop*, vol. 1649, pp. 40-49 (© 1999).

\* cited by examiner

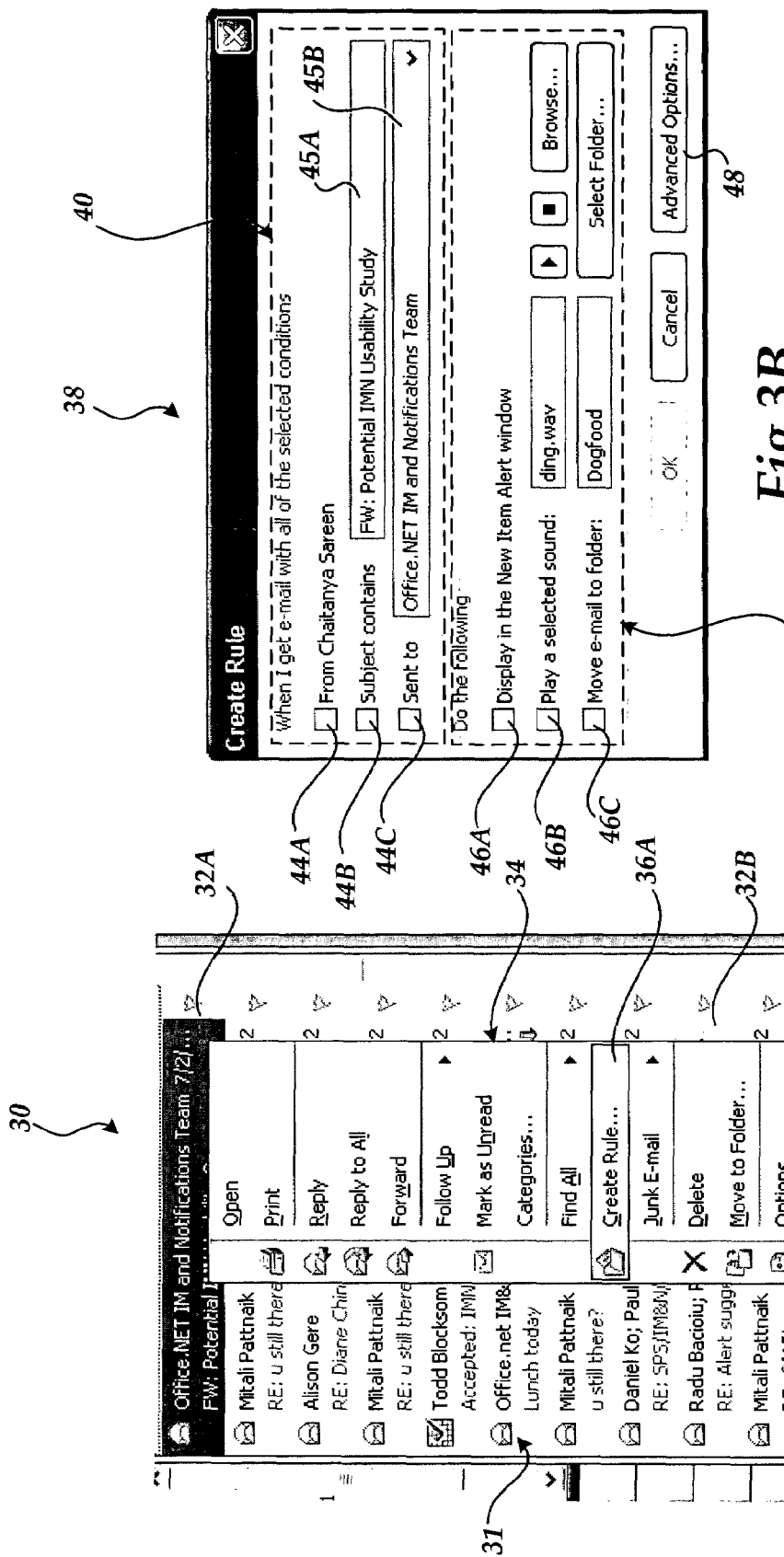

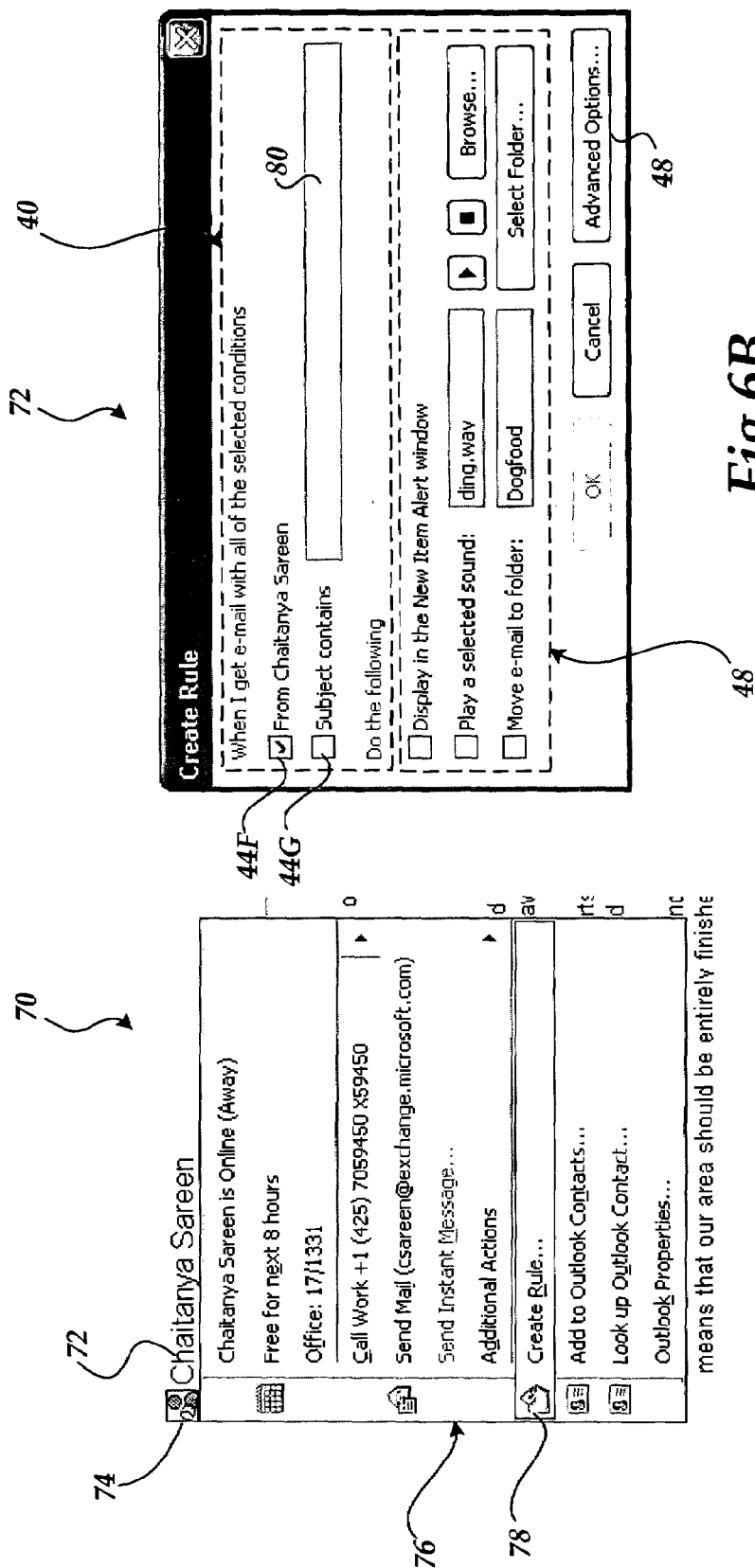

USER INTERFACE FOR CONTEXT SENSITIVE CREATION OF ELECTRONIC MAIL MESSAGE HANDLING RULES

TECHNICAL FIELD

The invention generally relates to the field of computer user interfaces and, more specifically, to the field of user interfaces for creating electronic mail message handling rules.

BACKGROUND OF THE INVENTION

As the use of electronic mail ("e-mail") has become more and more pervasive, users have become inundated with an ever increasing volume of e-mail messages. In order to deal with the increased volume of e-mail messages, many users utilize e-mail client applications that support the use of e-mail handling rules. E-mail handling rules allow a user to define one or more conditions that should be tested for when an e-mail message is received. One or more corresponding actions may also be defined that are performed when e-mail messages are received that satisfy the conditions. For instance, an e-mail rule may be defined by a user that identifies incoming e-mail messages from a particular sender and moves any messages received from the sender to a particular folder for storage. As another example, an e-mail rule may be defined that identifies incoming e-mail messages that contain specific text in the subject line and then plays a particular sound when e-mail messages having matching text in the subject are received. Many other combinations of conditions and actions may be defined to handle e-mail messages in a virtually unlimited number of different ways.

Although many e-mail client applications include support for e-mail handling rules, this feature has long been underutilized by users. The neglect of this feature appears to be primarily due to the fact that the process of defining e-mail handling rules in many e-mail client applications is a difficult and confusing process for users. In particular, in some e-mail client applications the user interface for creating e-mail handling rules contains literally dozens of possible choices for defining the conditions and the actions to be performed when the conditions are met. As a result of the complicated user interfaces previously provided for defining e-mail handling rules, users have been discouraged from utilizing this valuable and time-saving feature.

It is with respect to these considerations and others that the various embodiments of the present invention have been made.

SUMMARY OF THE INVENTION

In accordance with the present invention, the above and other problems are solved by a contextually sensitive user interface for defining e-mail handling rules. Utilizing the user interface, users can more easily define e-mail handling rules than through the use of previous user interfaces.

In accordance with aspects of the invention, a contextually sensitive user interface for defining an e-mail message handling rule is provided. The user interface includes one or more user interface objects for specifying conditions for the rule. The user interface also includes one or more user interface objects for defining the actions to be performed if the specified conditions are met. For instance, the user interface may include a first portion including check boxes or other types of user interface objects that may be utilized by a user to specify the conditions for the rule. A second portion may also be provided including check boxes or other types of user interface objects through which a user may select the actions that should be performed if the selected conditions are satisfied by a given e-mail message.

The conditions that are displayed within the user interface for selection are chosen, at least in part, based upon the context in which a request to create the e-mail handling rule is received. For instance, if a request to create an e-mail handling rule is received while a user is reading an e-mail message, the conditions displayed within the user interface for selection may include a condition based on the identity of the sender of the e-mail message being read, a condition based on the subject of the e-mail message being read, or a condition based on the identity of one of the intended recipients of the e-mail message being read. If a request to create an e-mail handling rule is received while a user is creating a new e-mail message, the conditions displayed within the user interface for selection may include a condition based on the identity of the intended recipient of the newly created electronic mail message or a condition based upon the subject text of the created electronic mail message. If a request to create an e-mail handling rule is received concurrently with the selection of a displayed user name, the conditions displayed within the user interface for selection may include a condition based upon receiving an e-mail message from a user identified by the selected name or a condition based upon the subject text of a received e-mail message.

According to another aspect of the invention, a method for providing a user interface for defining an e-mail handling rule is provided. According to the method, a request may be received to create an e-mail handling rule. In response to receiving such a request, the context in which the request was received is identified. A user interface for defining the e-mail handling rule is then provided. The content of the user interface is defined, at least in part, based upon the context in which the request to create the e-mail handling rule was received.

According to other aspects of the methods provided herein, the user interface provided may include one or more user interface objects for defining one or more conditions for the rule. The user interface may also include one or more user interface objects for defining one or more actions to be performed if the selected conditions are satisfied. The conditions for the rule displayed in the user interface may be selected based upon the context in which the request to create the e-mail handling rule is received, and may be a subset of all of the possible conditions that may be tested. In particular, the conditions identified in the user interface may comprise one or more of the conditions most commonly utilized when a request to create an e-mail handling rule is received from within the particular context.

According to another aspect of the invention provided herein, the context in which a request to create an e-mail handling rule may include the context of reading a received e-mail message. When a request to create an e-mail handling rule is received in this context, the conditions set forth in the user interface may include a condition for the rule based on the identity of a sender of the electronic mail message being read, a condition for the rule based on a subject of the electronic mail message being read, or a condition for the rule based on the identity of one or more intended recipients of the electronic mail message being read.

Alternatively, a request to create a new e-mail handling rule may be received in the context of creating a new e-mail message. If such a request is received in this context, the available conditions displayed within the user interface may include a condition for the rule based on the identity of the intended recipient of the newly created e-mail mail message or a condition for the rule based on a subject of the created e-mail mail message. Similarly, a request to create a new e-mail handling rule may be received in the context of a selected user name. If the request is received when a user name has been selected, the user interface may include conditions for the rule based on the selected user name or based upon a subject of a received electronic mail message. Other contexts may be detected and other conditions may be displayed within the user interface and made available for selection based upon those contexts.

The invention may be implemented as a computer process for providing the user interface, a computing system for providing the user interface, or as an article of manufacture such as a computer program product or computer readable media. The computer program product may be a computer storage media readable by a computer system and encoding a computer program of instructions for executing a computer process for providing the user interface. The computer program product may also be a propagated signal on a carrier readable by a computing system and encoding a computer program of instructions for executing a computer process.

These and various other features, as well as advantages, which characterize the present invention, will be apparent from a reading of the following detailed description and a review of the associated drawings.

BRIEF DESCRIPTION OF THE DRAWINGS

FIGS. 3A-7 are screen diagrams illustrating various user interfaces and the features contained therein provided by the embodiments of the present invention.

DETAILED DESCRIPTION OF THE INVENTION

Figure 1:
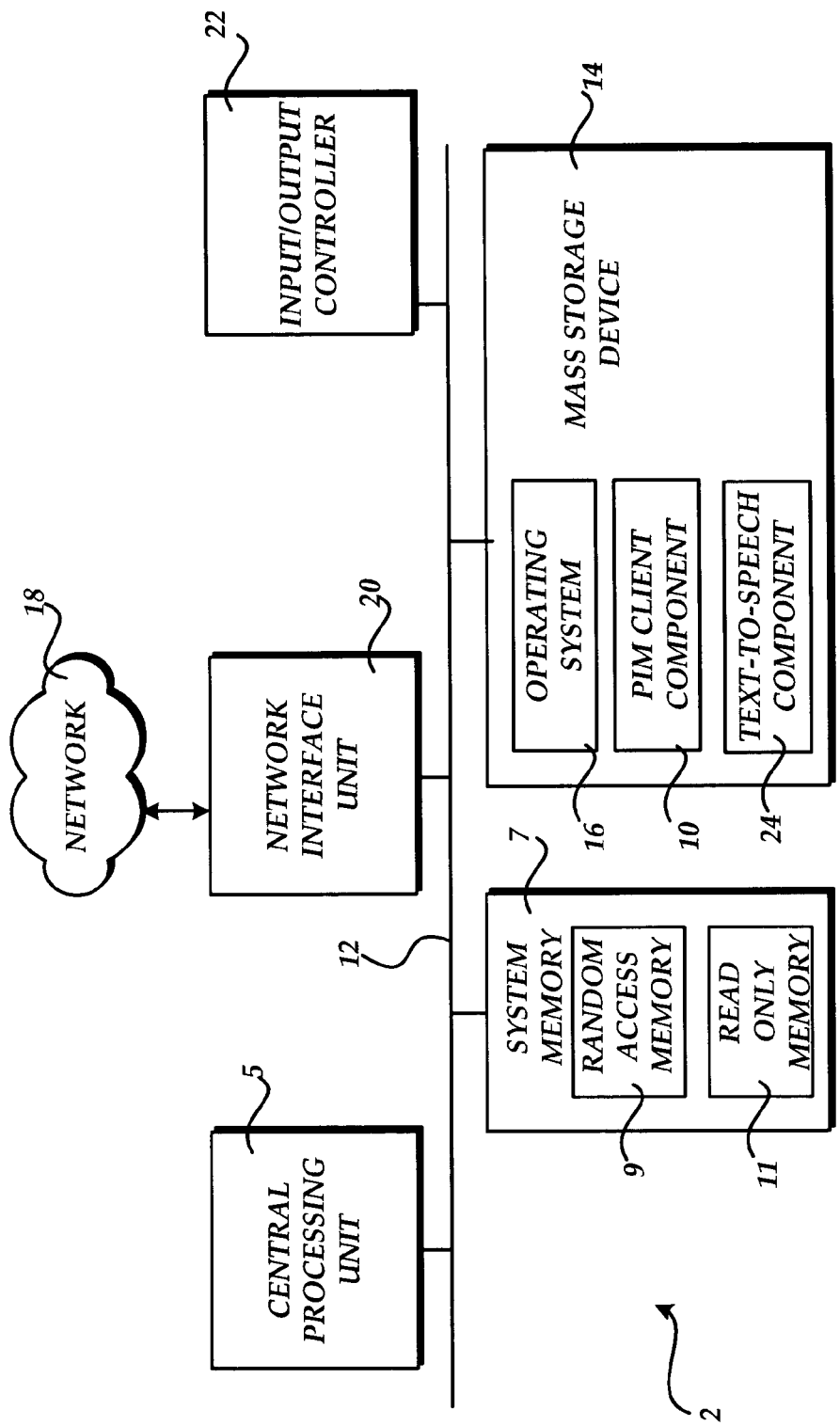
FIG. 1 is a computer system architecture diagram illustrating a computer system utilized in and provided by the various embodiments of the invention.

Referring now to the drawings, in which like numerals represent like elements, various aspects of the present invention will be described. In particular, FIG. 1 and the corresponding discussion are intended to provide a brief, general description of a suitable computing environment in which embodiments of the invention may be implemented. While the invention will be described in the general context of program modules that execute in conjunction with program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 1, an illustrative computer architecture for a client computer 2 utilized in the various embodiments of the invention will be described. The computer architecture shown in FIG. 1 illustrates a conventional desktop or laptop computer, including a central processing unit 5 ("CPU"), a system memory 7, including a random access memory 9 ("RAM") and a read-only memory ("ROM") 11, and a system bus 12 that couples the memory to the CPU 5. A basic input/output system containing the basic routines that help to transfer information between elements within the computer, such as during startup, is stored in the ROM 11. The client computer 2 further includes a mass storage device 14 for storing an operating system 16, application programs, and other program modules, which will be described in greater detail below.

The mass storage device 14 is connected to the CPU 5 through a mass storage controller (not shown) connected to the bus 12. The mass storage device 14 and its associated computer-readable media provide non-volatile storage for the client computer 2. Although the description of computer-readable media contained herein refers to a mass storage device, such as a hard disk or CD-ROM drive, it should be appreciated by those skilled in the art that computer-readable media can be any available media that can be accessed by the client computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the client computer 2.

According to various embodiments of the invention, the client computer 2 may operate in a networked environment using logical connections to remote computers, such as an e-mail server computer, through a network 18, such as the Internet. The client computer 2 may connect to the network 18 through a network interface unit 20 connected to the bus 12. It should be appreciated that the network interface unit 20 may also be utilized to connect to other types of networks and remote computer systems. The client computer 2 may also include an input/output controller 22 for receiving and processing input from a number of other devices, including a keyboard, mouse, or electronic stylus (not shown in FIG. 1). Similarly, an input/output controller 22 may provide output to a display screen, a printer, or other type of output device.

As mentioned briefly above, a number of program modules and data files may be stored in the mass storage device 14 and RAM 9 of the client computer 2, including an operating system 16 suitable for controlling the operation of a networked personal computer, such as the WIDOWS XP operating system from MICROSOFT CORPORATION of Redmond, Wash. The mass storage device 14 and RAM 9 may also store one or more program modules. In particular, the mass storage device 14 and the RAM 9 may store a personal information manager ("PIM") client component 10. The PIM client component 10 comprises an executable software component operative to provide functionality for managing personal information, including e-mail messages. According to one embodiment of the invention, the PIM client component 10 comprises the OUTLOOK messaging and PIM application from MICROSOFT CORPORATION of Redmond, Wash. It should be appreciated that embodiments of the invention may be implemented in other types of PIM and e-mail clients from other manufacturers.

As will be described in greater detail below, the PIM client component 10 includes functionality for creating and processing e-mail message handling rules. As known to those skilled in the art, e-mail message handling rules include two components: conditions that are tested for when an e-mail message is received and actions that are performed if each of the conditions are satisfied. For instance, conditions may be defined that are based upon the sender, recipients, subject, contents, or other characteristics of an e-mail message. Actions may be defined for moving the e-mail message to another folder, deleting the e-mail message, displaying a message, or performing other actions. Moreover, as will be described in greater detail below, according to one embodiment of the invention, a text-to-speech ("TTS") software component 24 may be utilized to speak specified text when the conditions of an e-mail handling rule are satisfied.

As will also be described in greater detail below, the PIM client component 10 includes functionality for providing a contextually sensitive user interface for defining e-mail handling rules. The content of the user interface for defining the e-mail handling rules is customized by the PIM client component 10 based upon the context in which the request to create the e-mail handling rule is received. For instance, if a user is reading an e-mail message received from another user, the contents of the user interface for defining the e-mail handling rule may be customized based upon the contents of the e-mail message being read. Similarly, if a user is creating a new e-mail message when the request to create a new e-mail handling rule is received, the contents of the user interface for creating the rule may be customized based on information contained within the new e-mail message being created. Other contexts may also be utilized to customize the contents of the user interface and are described in greater detail below with respect to FIGS. 2-7.

Figure 2:
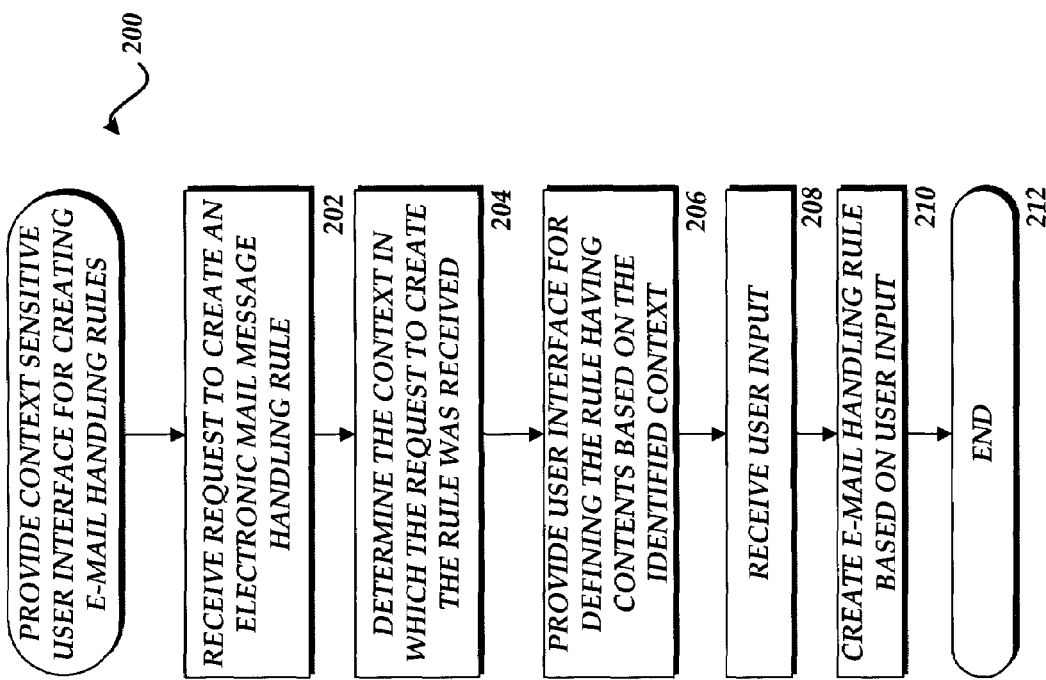
FIG. 2 is a flow diagram illustrating a process for generating a contextually sensitive user interface for defining electronic mail handling rules according to one embodiment of the invention.

Referring now to FIG. 2, a routine 200 will be described illustrating an exemplary process performed by the PIM client component 10 for providing a contextually sensitive user interface for defining e-mail handling rules. It should be appreciated that the logical operations of various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated in FIG. 2 and making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as received within the claims attached hereto.

As shown in FIG. 2, the routine 200 begins at operation 202, where a request is received to create an e-mail message handling rule. Such a request may be received by the PIM client component 10 in response to user selection of a menu item, a user interface button, or other type of user interface object. The context in which such a request may be received from a user to create an e-mail message handling rule will be described in greater detail below.

From operation 202, the routine 200 continues to operation 204, where the PIM client component 10 determines the context in which the request to create the new e-mail message handling rule was received. For instance, in one embodiment of the invention, a user may initiate a request to create a new e-mail handling rule while viewing a previously received e-mail message. In other embodiments, a user may request to create a new e-mail message handling rule while viewing a newly created, but not yet sent, e-mail message.

Alternatively, a user may request creation of a new e-mail message handling rule in the context of viewing a mail message received as the result of an alert subscription made by the user. As known to those skilled in the art, a subscription may be made by a user at an intranet or extranet Web site to receive electronic mail messages when certain conditions are satisfied. These electronic mail messages are referred to herein as "alerts." Additional details regarding the creation and utilization of alert e-mail messages is described in U.S. patent application Ser. No. 10/452,706, entitled "Method and Apparatus for Notifying a Computer User of the Occurrence of an Event" and filed on Jun. 2, 2003, and which is expressly incorporated herein by reference.

According to yet another embodiment of the invention, a request to create a new e-mail message handling rule may be received in the context of the selection of a user name. For instance, the operating system 16 may display a user name in any of the visual displays that it provides. A feature may be provided by the operating system 16 wherein the user name may be selected utilizing a mouse or other selection device. In response to the selection of the user name, a menu identifying actions that may be performed with respect to the selected user name may be displayed. One of the menu items may include the ability to create a new e-mail handling rule corresponding to the selected user name. Each of these contexts, and others, may be identified by the PIM client component 10 at operation 204 of the routine 200. Additional details regarding these contexts will be provided below.

From operation 204, the routine 200 continues to operation 206 where a user interface is provided by the PIM client component 10 to assist the user in creating the new e-mail handling rule. In particular, the user interface provided by the PIM client component 10 includes content based on the context in which the request to create the new e-mail handling rule was received. For instance, if the request to create a new e-mail handling rule was received in the context of reading an e-mail message, the user interface provided by the PIM client component 10 may include a limited number of conditions for the rule, the conditions being based on the contents of the e-mail message being read. For instance, the user interface may be populated with a condition for the sender of the e-mail message being read, the subject of the e-mail message being read or the recipients of the e-mail message being read. Other conditions may be pre-populated into the user interface when a request to create the new e-mail handling rule is received from within another context. Additional details regarding the contents of the user interface provided by the PIM client component 10 for creating a new e-mail handling rule according to the various embodiments of the invention will be described in greater detail below with respect to FIGS. 3A-7.

As described briefly above, the user interface provided by the PIM client component 10 for creating a new e-mail message handling rule is also populated with a limited number of actions to be performed if the specified conditions are satisfied. In particular, the actions displayed within the user interface provided by the PIM client component 10 include the actions most commonly used by users when creating e-mail handling rules within the selected context. Additional details regarding the user interface for identifying actions to be performed when the selected conditions are satisfied are also described in greater detail below with respect to FIGS. 3A-7.

From operation 206, the routine 200 continues to operation 208 where user input is received selecting both the conditions for the new e-mail handling rule and the actions to be performed if the selected conditions are satisfied. Once the user has completed selecting the conditions and actions through the user interface provided by the PIM client component 10, the routine 200 continues to operation 210. At operation 210, the PIM client component 10 creates a new e-mail handling rule based on the user's selection within the user interface. The e-mail handling rule is then applied to new incoming message received by the PIM client component 10. The routine 200 then continues from operation 210 to operation 212, where it ends.

Referring now to FIG. 3A, additional details regarding one context in which a request may be received to create a new e-mail message handling rule will be described. As shown in FIG. 3A, a portion of a user interface 30 may be provided by the PIM client component 10 that includes a list 31 of received e-mail messages 32A-32N. As known to those skilled in the art, any of the messages 32A-32N in the list 31 may be selected to read the contents of the selected message. Alternatively, a selection may be made of the any of the messages 32A-32N in the list 31 utilizing a right mouse click or corresponding key combination. In response to such a selection, a menu 34 is displayed in conjunction with the selected e-mail message. In the portion of the user interface 30 illustrated in FIG. 3A, the message 32A has been selected and, in response thereto, the menu 34 has been displayed.

As also shown in FIG. 3A, the menu 34 includes a number of menu items identifying actions that may be performed with respect to the selected message 32A. For instance, the message may be opened, printed, deleted, or moved. A reply or other response mail may also be created to the message 32A. Additionally, according to one embodiment of the invention, a menu item 36A is provided in the menu 34 for creating a new e-mail message handling rule in the context of the selected message 32A. If the user selects the menu item 36A, the PIM client component 10 is operative to display the user interface dialog box shown in FIG. 3B.

Turning now to FIG. 3B, additional details regarding the user interface provided by the PIM client component 10 will be described. As shown in FIG. 3B, a user interface dialog box 38 is displayed in response to a request to create a new e-mail handling rule in the context of reading an e-mail message. The dialog box 38 includes a first portion 40 wherein a user can identify the particular conditions for the new e-mail handling rule. The dialog box 38 also includes a portion 48 wherein the user can identify the actions to be performed if the selected conditions are satisfied.

Figure 3C:
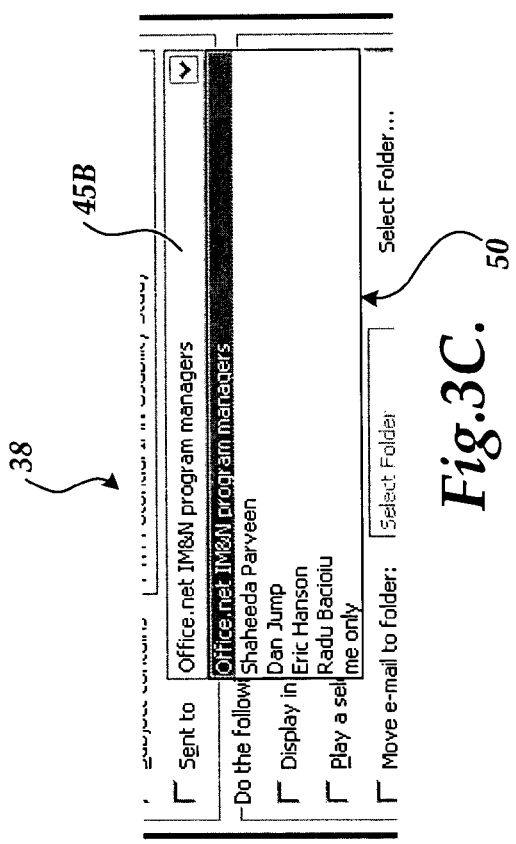

More particularly, according to one embodiment of the invention, the contents of the portion 40 are determined, based in part, on subject matter contained in the e-mail message that was being read when the request to create the new e-mail handling rule was made. For instance as shown in FIG. 3B, a user interface check box 44A is displayed within the dialog box 38 corresponding to a condition related to the sender of the e-mail message that was being read when the request to create the new rule was received. The check box 44A corresponds to a condition that has been pre-populated into the dialog box 38. Similarly, the check box 44B corresponds to a condition related to the subject text of the e-mail being read when the request to create the new e-mail handling rule was received. Moreover, the text box 45A has been pre-populated in the dialog box 38 containing the actual text of the message that was being read when the request was received. A checkbox 44C is also displayed in the dialog box 38 corresponding to a condition related to the recipients of the e-mail message that was currently being read when the request to create a new e-mail message handling rule was received. A dropdown menu 45B is also provided adjacent to the check box 44C for specifying a condition related to individual recipients of the e-mail message that was being read. Additional details regarding the use of the checkbox 45B are provided below with respect to FIG. 3C.

As also illustrated in FIG. 3B, the portion 48 of the dialog box 38 includes user interface objects for selecting the actions to be performed if the selected conditions are satisfied. In particular, the actions identified within the portion 48 include a subset of all the possible actions that may be performed. The actions set forth in the portion 48 of the dialog box 38 are several of the most commonly utilized actions. For instance, the check box 46A corresponds to an action for displaying a new item alert window when an e-mail message satisfying the specified conditions is received. Similarly, the check box 46B is utilized to play a selected sound when an e-mail message satisfying the selected conditions is received. User interface objects are also provided for selecting a particular sound to be played and for previewing the sound. Additionally, the check box 46C is provided for moving an e-mail message to a selected folder when the e-mail message satisfies the selected conditions. User interface objects are also provided for selecting the particular folder to which the e-mail message should be moved.

It should be appreciated that the user interface illustrated in FIG. 3B provides a customized and simplified user interface for defining the conditions and actions for a message handling rule. Moreover, it should be appreciated that while many users appreciate a simplified user interface, some users prefer a more full-bodied and robust user interface. Accordingly, a user interface button 48 is provided that, when selected, will provide an advanced user interface for defining an e-mail handling rule that contains all of the possible actions and all of the possible conditions available by the PIM client component 10.

Turning now to FIG. 3C, additional details regarding the use of the dropdown menu 45B will be described. As shown in FIG. 3C, when selected, the dropdown menu 45B presents a list 50 identifying each of the recipients of the e-mail message that was being read when the request to create a new e-mail handling rule was received. Any of the entries in the list 50 may be selected by a user to customize the conditions for the new e-mail message handling rule. It should be appreciated that one of the items in the list 50 includes an option for specifying a condition that is met when the e-mail message is sent to only the recipient of the e-mail message that was being read when the request to create the new e-mail message was received.

Figure 4A:
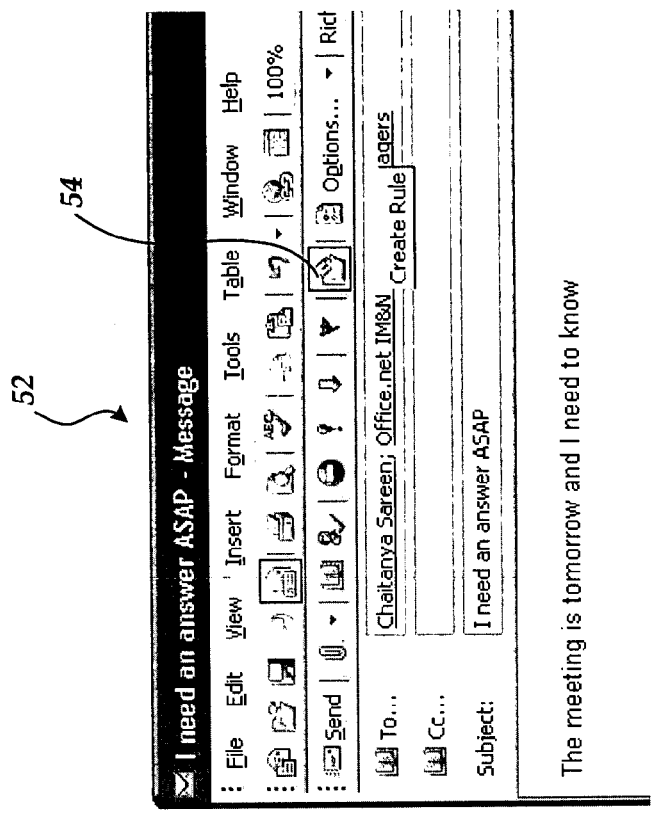

Turning now to FIG. 4A, additional details regarding the receipt of a request to create a new e-mail message handling rule in another context will be described. The user interface 52 shown in FIG. 4A comprises a portion of a user interface for creating a new e-mail message. As illustrated, the user interface 52 includes a user interface button 54 for creating a new e-mail message handling rule in the context of the newly created e-mail message. If the user interface button 54 is selected by a user while creating the new e-mail message, the user interface illustrated in FIG. 4B is displayed.

Figure 4B:
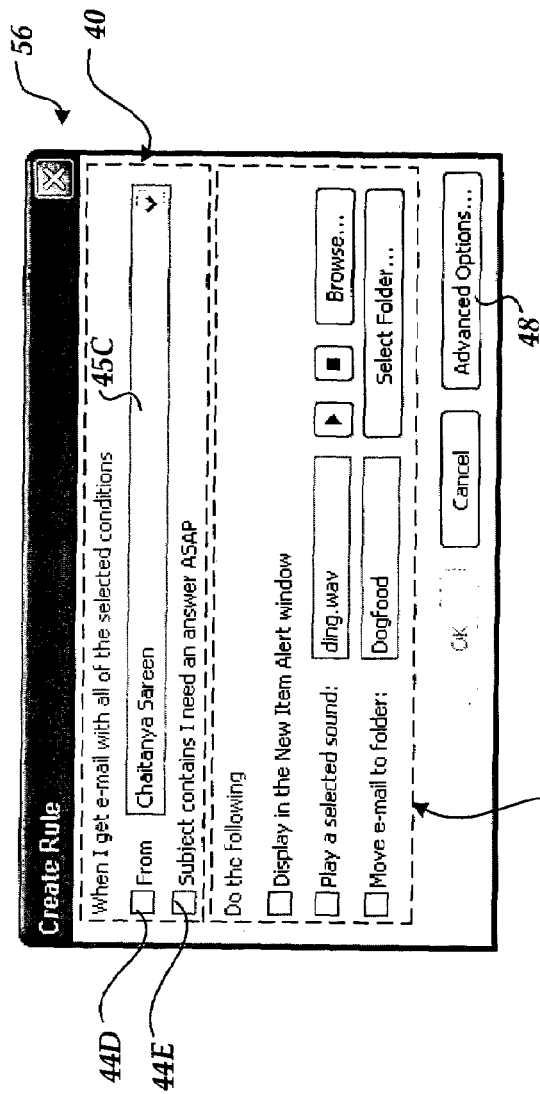

Referring now to FIG. 4B, the user interface for defining an e-mail handling rule in the context of a newly created e-mail message will be described. As shown in FIG. 4B, the dialog box 56 includes a portion 40 for defining conditions for the new e-mail handling rule and a portion 48 for defining the actions that are to be performed if the selected conditions are met. The portion 48 in the dialog box 56 shown in FIG. 4B is identical to the portion 48 illustrated in and described above with respect to FIG. 3B.

Figure 4C:
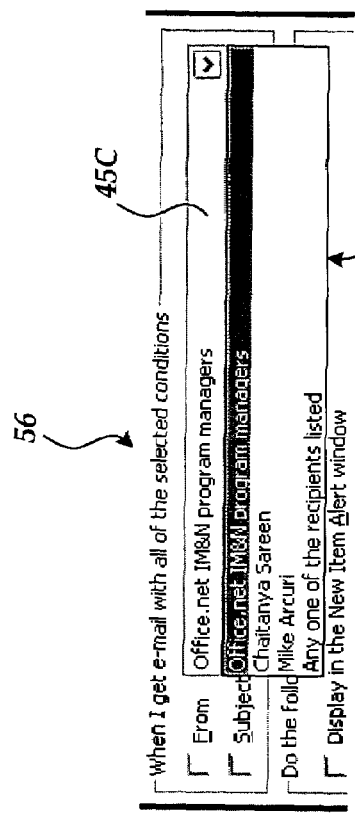

As illustrated in FIG. 4B, the dialog box 56 includes a user interface portion 40 containing user interface objects for defining the conditions associated with the new e-mail handling rule. In particular, a check box 44D is provided corresponding to a dropdown menu 45C. The dropdown menu 45C is illustrated in FIG. 4C and is populated with a list 58 of each of the intended recipients of the new e-mail message shown in FIG. 4A. As illustrated in FIG. 4C, the list 58 may include groups of users identified as intended recipients, individual users, or an item for selecting any of the intended recipients. Additionally, the portion 40 includes a checkbox 44E for identifying a condition corresponding to the subject text of the new e-mail message shown in FIG. 4A. The condition corresponding to the checkbox 44E is pre-populated with the subject text of the new e-mail message. In this manner, a new e-mail handling rule can easily be created for handling responses to the newly created e-mail from any of the intended recipients.

Figure 5A:
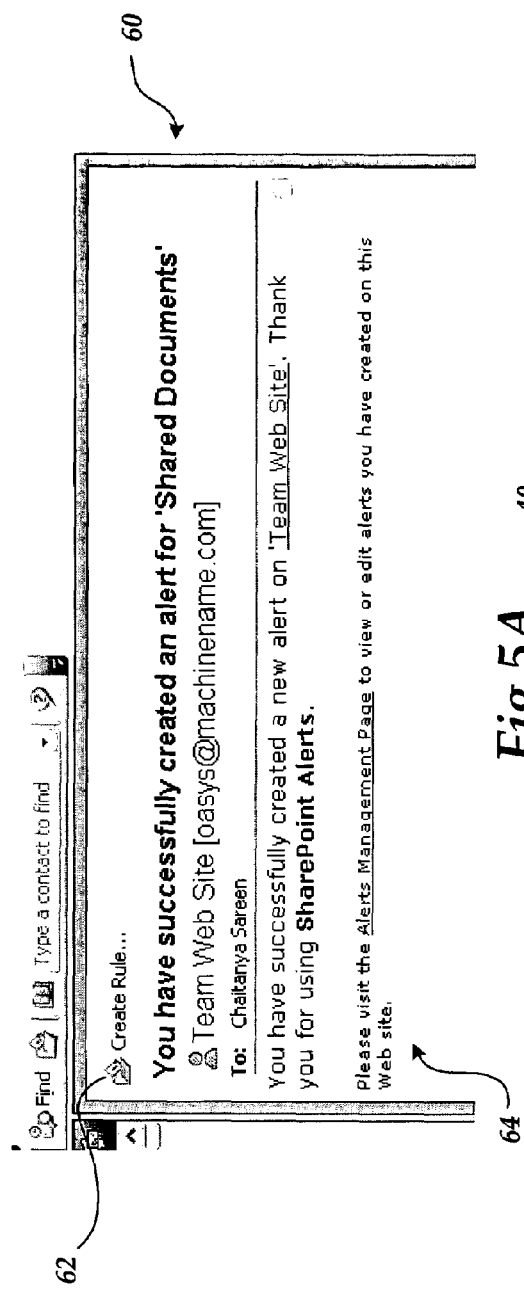
Figure 5B:
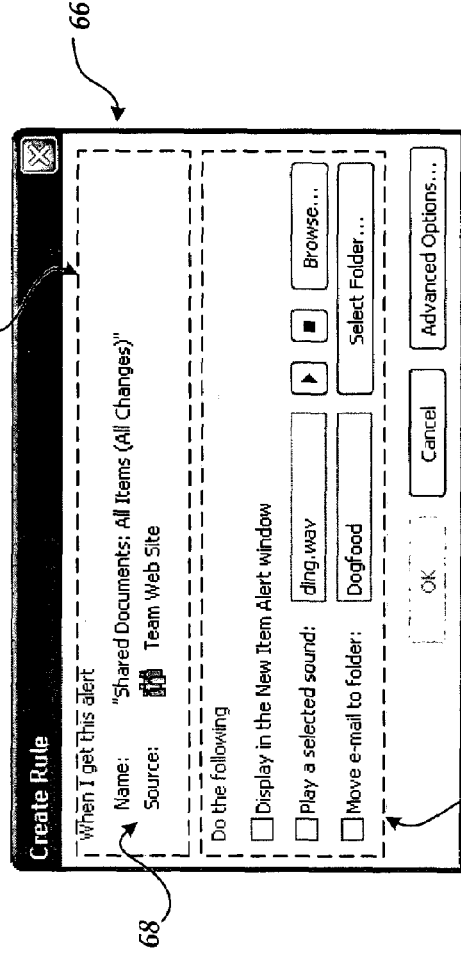

Turning now to FIGS. 5A and 5B, another embodiment of the invention will be described. In this embodiment of the invention, the user may create a new e-mail handling rule related to messages generated by a previously created alert subscription. As described briefly above, users may utilize Internet websites or intranet sites to create alert subscriptions. For instance, a user may create an alert subscription that forwards to the user a message each time a particular document is changed. Other types of alert subscriptions may also be created.

When an e-mail message generated in response to an alert subscription is received, the e-mail message is parsed to determine that the message was generated by the alert subscription. As shown in FIG. 5A, a reading pane of the PIM client component 10 may provide a preview 64 of the e-mail message generated by the alert subscription. If the PIM client component 10 determines that the e-mail is generated by an alert subscription, the PIM client component 10 is operative to display a user interface button 62 for creating a new e-mail handling rule related to the alert subscription. The button 62 is displayed in response to identifying a received e-mail message as an alert subscription e-mail.

If a user selects the user interface button 62, the user interface dialog box 66 shown in FIG. 5B is displayed. The user interface dialog box 66 includes a first portion 40 identifying the conditions for the new e-mail handling rule and a second portion 48 identifying the actions to be performed if the selected conditions are met. The portion 48 of the user interface dialog box 60 shown in FIG. 5 is identical to that discussed above with respect to FIG. 3B. The portion 40 of the user interface dialog box 66 includes text 68 that identifies the conditions for the new e-mail handling rule. In particular, the text 68 indicates that conditions are triggered when an alert message is received from the identified alert subscription source. The contents of the portion 40 are pre-populated with information obtained from the e-mail message that was opened when the user selected the user interface button 62. Accordingly, the user does not have to make any selections regarding the conditions for a new e-mail message handling rule created in the context of an e-mail message received in response to an alert subscription. The user only has to select one of the actions contained within the user interface portion 48 and accept the changes to create the new e-mail handling rule.

Referring now to FIGS. 6A and 6B, yet another embodiment of the invention will be described. In this embodiment of the invention, a user interface menu 76 is displayed in response to the selection of a user name 72 displayed by the operating system 16 or the PIM client component 10. As discussed briefly above, at various places in the user interface provided by the operating system 16, a user name 72 may be displayed. In conjunction with the user name 72, an icon 74 may be displayed indicating that the user name 72 is selectable. If the user name 72 is selected by using a right mouse click or other mouse or key combinations, the menu 76 is displayed. Through the menu 76, various actions may be performed with respect to the user name 72. For instance, an e-mail message may be created directed toward the user, a telephone call may be initiated directed toward the user, the user may be added to a contacts list, and calendar data may be obtained for the user. Additionally, the menu 76 includes a menu item 78 for creating a new e-mail message handling rule in the context of the user name 72. If the menu item 78 is created, the user interface dialog box 72 shown in FIG. 6B is displayed.

As shown in FIG. 6B, the user interface dialog box 72 includes a first portion 40 identifying a number of conditions for the new e-mail message handling rule. The user interface dialog box 72 also includes a second portion 48 identifying a number of actions to be performed if the selected conditions are met. The portion 48 of the user interface dialog box 72 is identical to the portion 48 described above with reference to FIG. 3B. As also shown in FIG. 6B, the portion 40 is pre-populated with a number of conditions related to the selected user name 72. For instance, a check box 44F is provided corresponding to a condition related to receiving an e-mail from the user identified by the user name 72. Additionally, a user interface check box 44G is provided and a text box 80 is provided in which a user may type e-mail subject text to also be tested as an e-mail handling rule condition. Through the use of the user interface dialog box 72, a new e-mail handling rule related to the context of a user name 72 may be created.

Figure 7:
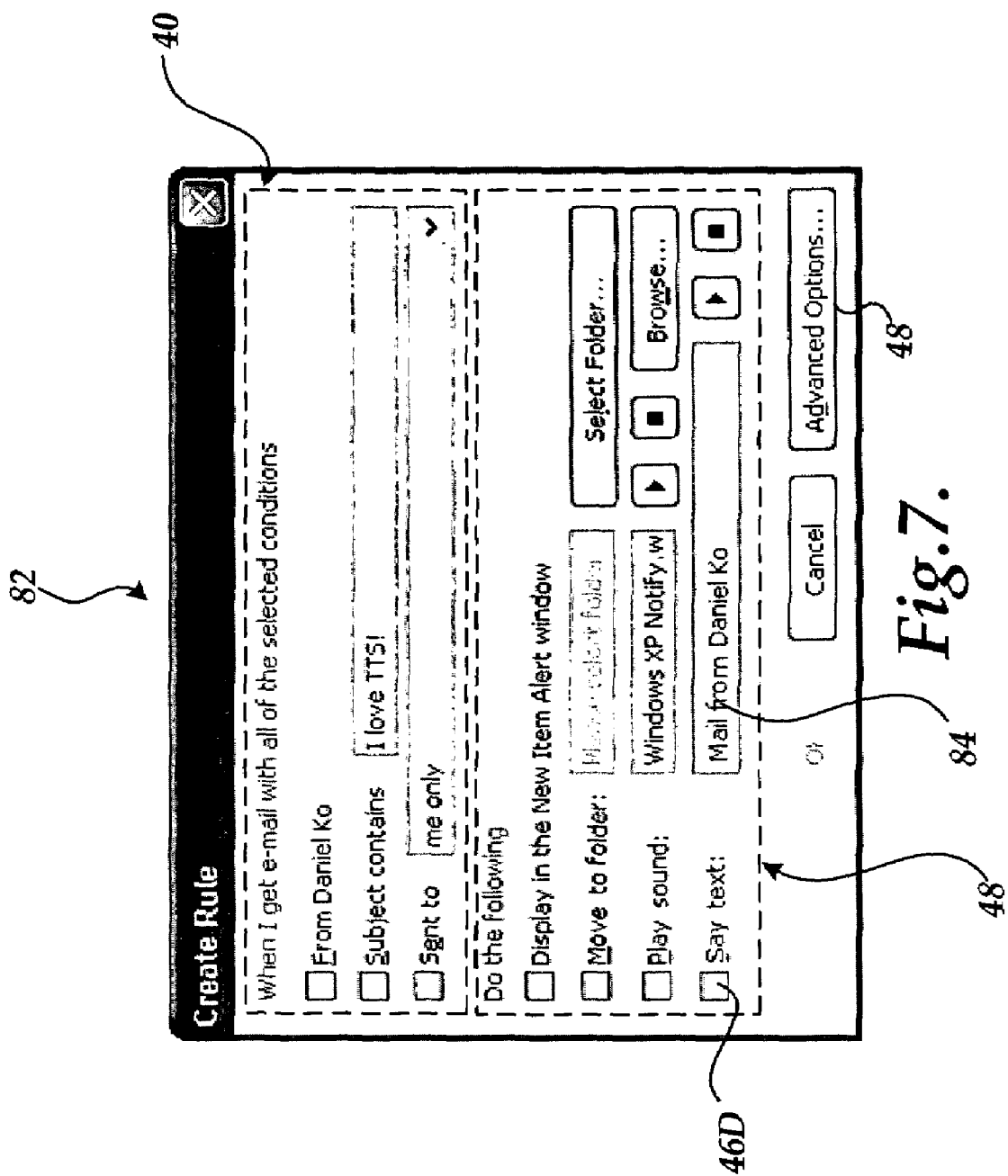

Turning now to FIG. 7, additional details regarding one embodiment of the invention will be described. As shown in FIG. 7 a user dialog box 82 may be provided to a user in response to requesting the creation of a new e-mail handling rule from any of the contexts described herein. The user interface dialog box 82 contains a portion 40 that identifies the conditions to be tested in the new e-mail handling rule. Additionally, the user interface dialog box 82 contains a portion 48 identifying a number of actions that may be performed in response to the selected conditions being satisfied. In particular, a user interface check box 46D is provided corresponding to an action for speaking specified text in response to the occurrence the selected conditions. As described above, the computer 2 is provisioned with a text-to-speech component 24 for speaking text based on provided text. Accordingly, a text box 84 is provided in which a user may specify the text to be spoken when the conditions identified in the user interface portion 40 are satisfied. Additionally, user interface buttons are provided for previewing the selected text. In this manner, a user may easily create a new e-mail handling rule that speaks the text specified in the text box 84 when any of the selected conditions occur.

As described herein, a user interface dialog box may be provided when a request is received to create a new e-mail handling rule in a particular context. It should be appreciated that, although examples of contexts in which a request may be generated have been provided, other contexts are possible. Additionally, it should also be appreciated that although the handling rules described herein are illustrated in the context of handling e-mail messages, other types of messages may also be handled by rules created in a similar fashion. In particular, messages generated as a result of instant messaging conversations and other types of communications may be handled by rules created in a similar fashion as described herein.

Based on the foregoing, it should be appreciated that the various embodiments of the invention include a method, system, apparatus, and computer-readable medium for providing a contextually sensitive user interface for defining e-mail handling rules. The above specification, examples and data provide a complete description of the manufacture and use of the composition of the invention. Since many embodiments of the invention can be made without departing from the spirit and scope of the invention, the invention resides in the claims hereinafter appended.

We claim:

1. A method for providing a user interface for defining an electronic message handling rule, the method comprising:

receiving a request to create the electronic message handling rule, wherein receiving the request to create the electronic message handling rule comprises receiving the request to create the electronic message handling rule from a user interface button displayed within an electronic message reading pane;

in response to the request, identifying a context in which the request to create the electronic message handling rule was received, the identified context being associated with receiving a subscription alert, wherein receiving the subscription alert comprises:

receiving an electronic mail message, parsing the electronic mail message to determine whether the electronic mail message was generated by the subscription alert, in response to determining that the electronic mail message was generated by the subscription alert, providing the user interface button for creating the electronic message handling rule, and providing a preview of the electronic mail message generated by the subscription alert, wherein providing the preview of the electronic mail message generated by the subscription alert comprises providing the preview of the electronic mail message in the reading pane; and providing, in response to a selection of the user interface button for creating the electronic message handling rule, a user interface for defining the electronic message handling rule, wherein providing, in response to the selection of the user interface button for creating the electronic message handling rule, the user interface for defining the electronic message handling rule comprises customizing a contents of the user interface based on the identified context associated with an operation on the electronic mail message, the operation comprising one of the following: reading the electronic mail message, selecting the electronic mail message, and creating the subscription alert associated with the electronic mail message, wherein providing, in response to the selection of the user interface button for creating the electronic message handling rule, the user interface for defining the electronic message handling rule further comprises providing:

a first user interface object for defining at least one condition for the electronic message handling rule, wherein the at least one condition is automatically pre-selected and a user does not make any selections regarding the at least one condition, a second user interface object for defining at least one action to be performed when the at least one condition is satisfied, wherein the at least one action to be performed comprises at least one of the following: displaying a new item alert window, selecting a sound, playing the selected sound, previewing the selected sound, moving the electronic mail message to a selected folder, speaking selected text, and previewing the selected text, and a third user interface object for defining the electronic message handling rule that contains all possible actions and all possible conditions.

2. The method of claim 1, wherein providing the first user interface object for defining the at least condition for the electronic message handling rule comprises providing a subset of all possible conditions for the electronic message handling rule.

3. The method of claim 1, wherein providing, in response to the selection of the user interface button for creating the electronic message handling rule, the user interface for defining the electronic message handling rule further comprises providing a fourth user interface object for setting a condition for the electronic message handling rule based on an identity of a sender of the received electronic mail message.

4. The method of claim 1, wherein providing, in response to the selection of the user interface button for creating the electronic message handling rule, the user interface for defining the electronic message handling rule further comprises providing a fourth user interface object for setting a condition for the electronic message handling rule based on a subject of the received electronic mail message.

5. The method of claim 1, wherein providing, in response to the selection of the user interface button for creating the electronic message handling rule, the user interface for defining the electronic message handling rule further comprises providing a fourth user interface object for setting a condition for the electronic message handling rule based on an identity of at least one intended recipient of the electronic mail message.

6. The method of claim 1, wherein providing, in response to the selection of the user interface button for creating the electronic message handling rule, the user interface for defining the electronic message handling rule further comprises providing a fourth user interface object for setting a condition for the electronic message handling rule based on an identity of the intended recipient of the created electronic mail message.

7. The method of claim 1, wherein providing, in response to the selection of the user interface button for creating the electronic message handling rule, the user interface for defining the electronic message handling rule further comprises providing a fourth user interface object for setting a condition for the electronic message handling rule based on a subject of the created electronic mail message.

8. The method of claim 1, wherein defining the at least one condition for the electronic message handling rule comprises defining the at least one condition to be associated with receiving an alert electronic mail message generated as a result of the subscription alert.

9. The method of claim 1, wherein providing, in response to the selection of the user interface button for creating the electronic message handling rule, the user interface for defining the electronic message handling rule further comprises providing a fourth user interface object for setting a condition for the electronic message handling rule based on the selected name.

10. The method of claim 1, wherein providing, in response to the selection of the user interface button for creating the electronic message handling rule, the user interface for defining the electronic message handling rule further comprises providing a fourth user interface object for setting a condition for the rule based on a subject of the received electronic mail message when the context comprises selecting a name.

11. A contextually sensitive user interface for defining an electronic message handling rule, the user interface comprising:
a first user interface object provided to a display device for defining at least one condition for the electronic message handling rule, wherein the at least one condition is automatically pre-selected and a user does not make any selections regarding the at least one condition, based on an identified context in which a request to create the electronic message handling rule was received, the identified context corresponding to receiving a subscription alert, wherein receiving the subscription alert comprises:
receiving an electronic mail message,
parsing the electronic mail message to determine whether the electronic mail message was generated by the subscription alert,
in response to determining that the electronic mail message was generated by the subscription alert, providing a user interface button for creating the electronic message handling rule, and
providing a preview of the electronic mail message generated by the subscription alert, wherein providing the preview of the electronic mail message generated by the subscription alert comprises providing the preview of the electronic mail message in a reading pane of a software for proving the electronic mail message;
a second user interface object for defining at least one action to be performed if the at least one specified condition is satisfied, wherein the at least one action to be performed comprises at least one of the following: displaying a new item alert window, selecting a sound, playing the selected sound, previewing the selected sound, moving the electronic mail message to a selected folder, speaking selected text, and previewing the selected text; and
a third user interface object for defining the electronic message handling rule that contains all of the possible actions and all of the possible conditions.

12. The contextually sensitive user interface of claim 11, further comprising a fourth user interface object for setting a condition for the electronic message handling rule based on the identity of a sender of the electronic mail message when the identified context comprises reading the electronic mail message.

13. The contextually sensitive user interface of claim 11, further comprising a fourth user interface object for setting a condition for the electronic message handling rule based on a subject of the electronic mail message when the identified context comprises reading the electronic mail message.

14. The contextually sensitive user interface of claim 11, further comprising a fourth user interface object for setting a condition for the electronic message handling rule based on an identity of at least one intended recipient of the electronic mail message when the identified context comprises reading the electronic mail message.

15. The contextually sensitive user interface of claim 11, further comprising a fourth user interface object for setting a condition for the electronic message handling rule based on an identity of the intended recipient of the electronic mail message when the identified context comprises creating the electronic mail message.

16. The contextually sensitive user interface of claim 11, further comprising a fourth user interface object for setting a condition for the electronic message handling rule based on a subject of the electronic mail message when the identified context comprises creating the electronic mail message.

17. The contextually sensitive user interface of claim 11, further comprising a fourth user interface object for setting a condition for the electronic message handling rule based on the selected name when the identified context comprises selecting a name.

18. The contextually sensitive user interface of claim 11, further comprising a fourth user interface object for setting a condition for the electronic message handling rule based on a subject of a received electronic mail message when the identified context comprises selecting a name.

19. The contextually sensitive user interface of claim 11, further comprising a fourth user interface object containing a subset of all actions for defining the at least one condition and the at least one action for handling the electronic message.

20. The contextually sensitive user interface of claim 19, wherein the fourth user interface object contains at least one commonly utilized action to be performed.

21. A system for providing a user interface for defining an electronic message handling rule, the system comprising:
a memory storage; and
a processing unit coupled to the memory storage, wherein the processing unit is operative to:
receive a request to create the electronic message handling rule from a user interface button displayed within an electronic message reading pane;
in response to the request, identify a context in which the request to create the electronic message handling rule was received, wherein the identified context comprises a context selected from one of: a creation of an alert subscription comprising a generation of an alert electronic mail message and a receipt of the alert subscription comprising:
a receipt of the generated alert electronic mail message,
a parsing of the generated alert electronic message to determine whether the generated alert electronic mail message was generated by the alert subscription, and
in response to a determination that the generated alert electronic mail message was generated by the alert subscription, a provision of a user interface button for configured to create the electronic message handling rule, and
a preview of the generated alert electronic mail message generated by the alert subscription, wherein the preview of the generated alert electronic mail message generated by the alert subscription comprises providing the preview of the generated alert electronic mail message in the reading pane; and
provide a user interface for defining the electronic message handling rule, wherein a contents of the user interface is customized based on the identified context associated with an operation on the electronic mail message, the operation comprising one of the following: a reading of an electronic mail message, selecting the electronic mail message, and a creation of the alert subscription associated with the electronic mail message, wherein the user interface for defining the electronic message handling rule comprises:

a first user interface portion for defining at least one condition for the electronic message handling rule, wherein the at least one condition is automatically pre-selected and a user does not make any selections regarding the at least one condition, a second user interface portion for defining at least one action to be performed if the at least one condition is satisfied, wherein the at least one action to be performed comprises at least one of the following: a display of a new item alert window, a selection of a sound, a playing of the selected sound, a preview of the selected sound, a moving of the electronic message to a selected folder, a speaking of selected text, and a preview of the selected text, and a third user interface portion for defining the electronic message handling rule that contains all possible actions and all possible conditions.

* * * * *